US012209970B2

(12) United States Patent
Niedermeier et al.

(10) Patent No.: US 12,209,970 B2
(45) Date of Patent: Jan. 28, 2025

(54) METHOD AND DEVICE FOR OPTICALLY INSPECTING CONTAINERS

(71) Applicant: KRONES AG, Neutraubling (DE)

(72) Inventors: Anton Niedermeier, Offenstetten (DE); Rainer Kwirandt, Barbing (DE)

(73) Assignee: KRONES AG, Neutraubling (DE)

( * ) Notice: Subject to any disclaimer, the term of this patent is extended or adjusted under 35 U.S.C. 154(b) by 355 days.

(21) Appl. No.: 17/596,265

(22) PCT Filed: Mar. 6, 2020

(86) PCT No.: PCT/EP2020/056019
§ 371 (c)(1),
(2) Date: Dec. 6, 2021

(87) PCT Pub. No.: WO2020/244818
PCT Pub. Date: Dec. 10, 2020

(65) Prior Publication Data
US 2022/0307987 A1 Sep. 29, 2022

(30) Foreign Application Priority Data
Jun. 6, 2019 (DE) .................... 10 2019 208 299.8

(51) Int. Cl.
G01N 21/88 (2006.01)
G01N 21/90 (2006.01)

(52) U.S. Cl.
CPC ..... *G01N 21/8806* (2013.01); *G01N 21/9036* (2013.01); *G01N 2021/8845* (2013.01)

(58) Field of Classification Search
CPC .......... G01N 21/9027; G01N 21/8851; G01N 21/31; G01N 15/1427; G01N 21/51;
(Continued)

(56) References Cited

U.S. PATENT DOCUMENTS 6,304,323 B1 10/2001 Ishikura et al.
10,422,755 B2 * 9/2019 Sones .................... G01N 21/90
(Continued)

FOREIGN PATENT DOCUMENTS

CN 103743757 A 4/2014
DE 10140009 A1 3/2003
(Continued)

OTHER PUBLICATIONS

ISA European Patent Office, International Search Report Issued in Application No. PCT/EP2020/056019, Jun. 26, 2020, WIPO, 6 pages.

*Primary Examiner* — Michael P Stafira
(74) *Attorney, Agent, or Firm* — McCoy Russell LLP

(57) ABSTRACT

The disclosure relates to a method for optically inspecting containers, wherein the containers are transported to an inspection unit with an illumination unit and with a camera, wherein the illumination unit emits light from a flat light-emitting surface, wherein the light is transmitted or reflected via the containers, wherein the camera captures a respective at least one of the containers and the light transmitted or reflected via same in at least one camera image, and wherein the at least one camera image is analysed by an image processing unit for intensity information in order to identify foreign bodies and/or defects in the container.

15 Claims, 7 Drawing Sheets

(58) Field of Classification Search
CPC ......... G01N 15/1429; G01N 2015/144; G01N 2015/1445; G01N 2015/1452; G01N 2015/1472; G01N 2015/1477; G01N 2015/1493; G01N 2015/1497; G01N 21/17; G01N 15/00; G01N 2021/1765; G01N 33/15; G01N 21/90; G01N 21/9036; G01N 21/9018; G01N 2021/8845; G01N 21/9054; G01N 15/1433; G01N 2015/1027; G01N 2015/1029; G01N 35/00732; G01N 21/9045; G01N 21/9081; G01N 2035/1025; G01N 21/8806; G01N 35/1016; G01N 21/909; G01N 2021/8861; G01N 23/10; G01N 2021/8864; G01N 21/9009; G01N 21/958; G01N 2201/06146; G01N 2201/0636; G01N 2201/12; G01N 33/49; G01N 35/00584; G01N 2021/8887; G01N 2035/0406; G01N 2201/102; G01N 2021/945; G01N 2021/9511; G01N 2035/1018; G01N 21/01; G01N 21/251; G01N 21/255; G01N 21/314; G01N 21/4738; G01N 21/956; G01N 2201/1293; G01N 33/491; G01N 33/492; G01N 35/02; G01N 2021/4778; G01N 2021/559; G01N 2021/8427; G01N 2035/0493; G01N 21/8422; G01N 21/88; G01N 35/04; G01N 15/042; G01N 2021/0118; G01N 2035/00752; G01N 2035/047; G01N 21/00; G01N 21/25; G01N 21/47; G01N 21/55; G01N 21/63; G01N 21/94; G01N 21/9508; G01N 2015/045; G01N 2015/047; G01N 2015/055; G01N 2021/845; G01N 2021/8812; G01N 2021/8825; G01N 2021/8907; G01N 2035/00801; G01N 2035/0401; G01N 21/13; G01N 21/253; G01N 2201/0627; G01N 27/30; G01N 27/416; G01N 27/48; G01N 29/44; G01N 33/00; G01N 33/5002; G01N 33/553; G01N 33/569; G01N 35/00; G01N 35/00613; G01N 35/00663

See application file for complete search history.

(56) References Cited

U.S. PATENT DOCUMENTS

| | | |
|---|---|---|
| 2008/0291438 A1 | 11/2008 | Akkerman et al. |
| 2008/0310701 A1 | 12/2008 | Caroli et al. |
| 2011/0050884 A1 * | 3/2011 | Niedermeier ...... G01N 21/9036 |
| | | 382/142 |
| 2011/0140010 A1 | 6/2011 | Akkerman et al. |
| 2013/0215261 A1 | 8/2013 | Rahmani et al. |
| 2016/0077020 A1 | 3/2016 | Leconte et al. |
| 2018/0156740 A1 | 6/2018 | Sones et al. |

FOREIGN PATENT DOCUMENTS

| | | | | |
|---|---|---|---|---|
| DE | 102004054349 A1 * | 5/2006 | ............... | B07C 5/34 |
| DE | 102014220598 A1 | 4/2016 | | |
| DE | 102017008406 A1 | 3/2019 | | |
| EP | 0258071 A2 * | 3/1988 | | |
| EP | 0472881 A2 | 3/1992 | | |
| EP | 0926486 A2 | 6/1999 | | |
| EP | 1241467 A2 | 9/2002 | | |
| EP | 2369328 A2 | 9/2011 | | |
| EP | 3312592 A1 * | 4/2018 | | |
| FR | 2500631 A1 * | 8/1982 | | |
| WO | WO-9214142 A1 * | 8/1992 | ......... | G01N 21/9027 |
| WO | WO-2013144509 A1 * | 10/2013 | ........... | B07C 5/3408 |
| WO | WO-2016055209 A1 * | 4/2016 | ............. | G01N 21/90 |

* cited by examiner

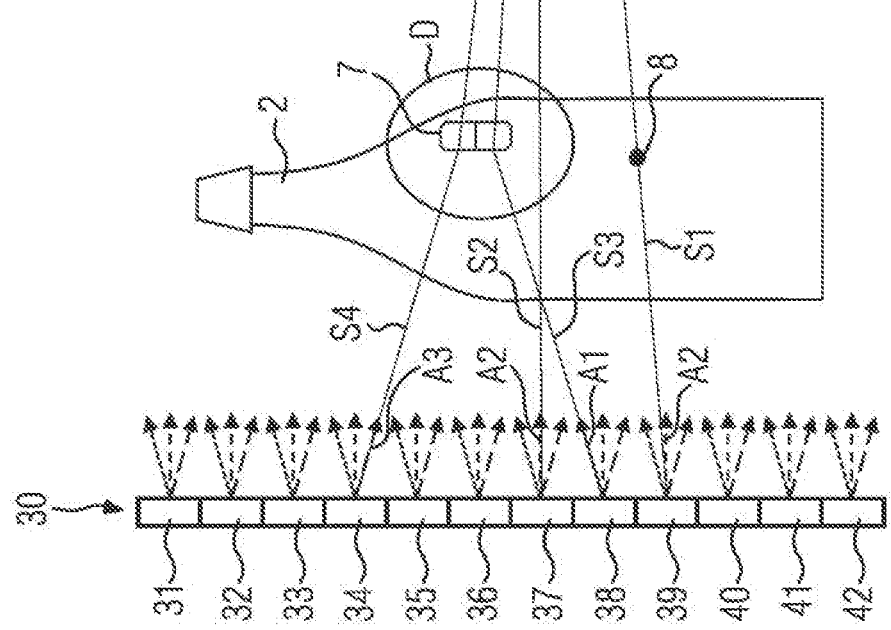
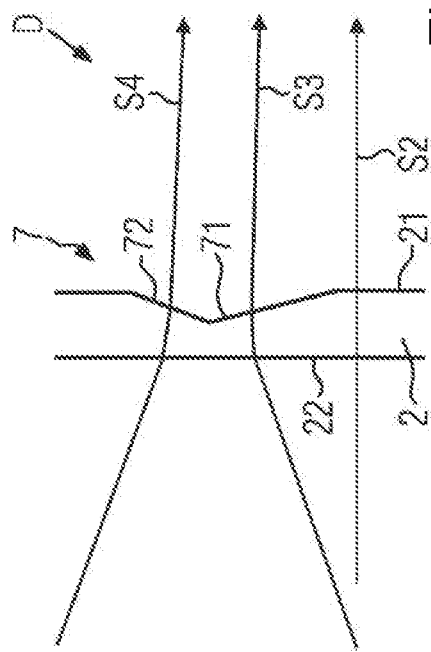
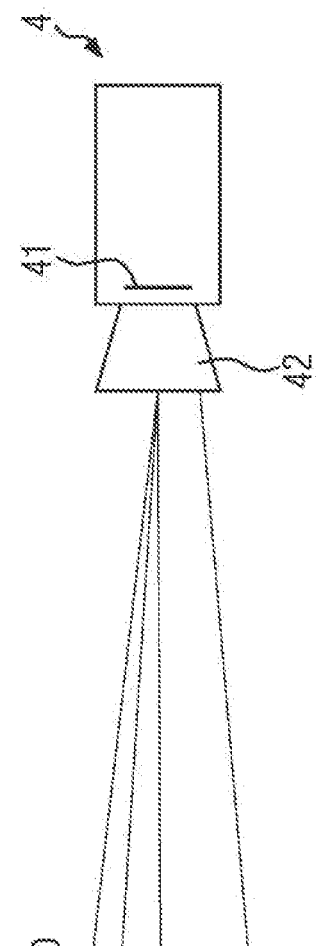
Figure 7B
Figure 7A

METHOD AND DEVICE FOR OPTICALLY INSPECTING CONTAINERS

CROSS REFERENCE TO RELATED APPLICATIONS

The present application is a U.S. National Phase of International Application No. PCT/EP2020/056019 entitled "METHOD AND DEVICE FOR OPTICALLY INSPECTING CONTAINERS," and filed on Mar. 6, 2020. International Application No. PCT/EP2020/056019 claims priority to German Patent Application No. 10 2019 208 299.8 filed on Jun. 6, 2019. The entire contents of each of the above-listed applications are hereby incorporated by reference for all purposes.

TECHNICAL FIELD

The disclosure relates to a method and a device for optically inspecting containers.

BACKGROUND AND SUMMARY

Typically, such methods and devices are used to inspect containers for foreign bodies and/or defects. For this purpose, the containers are transported to an inspection unit with an illumination unit and with a camera to enable inspection in transmitted light or in reflected light. The illumination unit emits light from a planar light-emitting surface, which is transmitted or reflected via the containers and then captured by the camera as at least one camera image. Subsequently, the at least one camera image is evaluated with an image processing unit for intensity information in order to detect the foreign bodies and/or defects of the containers.

For example, such methods and devices are used in sidewall, base and/or fill level inspection of empty containers or containers already filled with a product.

For detecting foreign bodies, the containers are usually inspected with a diffusely emitting light-emitting surface in order to suppress, for example, glass embossing or water drops in the camera image. The foreign bodies can be, for example, dirt, product residues, remnants of labels or the like.

On the other hand, a directionally emitting light-emitting surface is used to detect defects in order to enhance the resulting light refraction in the camera image. Defects can, for example, be damage to the containers, such as chipped glass. Likewise, it is conceivable that they are defectively produced material spots, such as local material thickening.

Consequently, two different inspection units with different radiation characteristics of the illumination units are usually used in order to allow the detection of foreign bodies and defects equally well.

The disadvantage of this is that a corresponding amount of effort and installation space is required for the optical inspection of the containers.

From US 2013/0215261 A1 there is known a method for detecting defects in glass articles and a device suitable for this purpose. For contrast enhancement here it is proposed an illumination with several light patterns shifted against each other.

DE 10 2014 220 598 A1 discloses an inspection device for the transmitted light inspection of containers with a device for subdividing the light-emitting surface into at least two predominantly horizontally separated partial areas, which can be selectively switched on and off for sidewall inspection and/or closure head inspection of the container.

U.S. Pat. No. 6,304,323 B1 discloses a method for detecting defects in bottles.

EP 0 472 881 A2 discloses a system and method for optically inspecting the bottom surfaces of transparent containers.

US 2008/0310701 A1 discloses a method and a device for visually inspecting an object.

EP 0 926 486 B1 discloses a method for optically inspecting transparent containers using infrared and polarized visible light.

DE 10 2017 008 406 A1 discloses an inspection device with color illumination for inspecting containers for contamination and three-dimensional container structures. For this purpose, a radiation source has several spatially separated radiation zones that emit radiation in different wavelength ranges or with different intensities. In the case of decorative elements, this produces a local color contrast, whereas in the case of contaminants, only a local brightness contrast is produced without a local color contrast.

In this case, however, it is often not possible to detect and reliably evaluate the local color contrast, for example in the case of particularly small defects or defects with low curvature.

The object of the present disclosure is to provide a method and a device for optically inspecting containers, wherein both foreign bodies and defects can be detected with less effort, while requiring less installation space.

To solve the problem, the disclosure provides a method for optically inspecting containers.

Extensive investigations by the applicant have shown that the light emitted from the light-emitting surface passes through undamaged areas of a container predominantly without deflection or with only slight deflection. In contrast, the light is refracted differently at the defective areas than at the undamaged areas due to the associated local change in the container surface. Consequently, the light is deflected via the defect from a different beam direction of the light-emitting surface towards the camera than in the case of the undamaged areas. Conversely, this is often less or not at all the case with foreign bodies, since contamination, for example, leads to local absorption of the light without significantly influencing the light path towards the camera.

Since the light is emitted from the emission locations of the planar light-emitting surface in the different emission directions with different wavelength ranges, it can be determined for the pixels of the camera image, independently of the intensity characteristic of the light-emitting surface, whether the corresponding light component was deflected by a defect or whether it passed through the undamaged areas of the respective container with little or no deflection. As a result of the fact that the image processing unit evaluates the at least one camera image with respect to the various wavelength ranges, it is possible, for example, to distinguish a defect from a foreign body on the basis of a local change in the detected wavelength range. Conversely, the intensity information can still be evaluated in order to detect the absorption of light by foreign bodies particularly well when the radiation characteristic of the light-emitting surface is as diffuse as possible. Consequently, the method according to the disclosure enables the detection of both foreign bodies and defects equally well with a single inspection unit. The fact that this is done with a single inspection unit means that less installation space is required for this.

The optical inspection method may be used in a beverage processing plant. The process may be implemented upstream or downstream of a container manufacturing process, cleaning process, filling process and/or capping process. The method may be used in a full bottle or empty bottle inspection machine. For example, the method may be used to inspect returnable containers.

The containers may be designed to hold beverages, food products, hygiene products, pastes, chemical, biological and/or pharmaceutical products. The containers may be in the form of bottles, particularly plastic bottles or glass bottles. In particular, plastic bottles may be PET, PEN, HD-PE or PP bottles. Likewise, they may be biodegradable containers or bottles whose main components consist of renewable raw materials, such as sugar cane, wheat or corn. The containers may be provided with a closure, for example, a crown cork, screw cap, tear-off cap, or the like. Likewise, the containers may be present as empties, for instance, without a closure.

Conceivably, the method may be used to inspect the sidewall, base, mouth, threads, and/or contents of the containers. Foreign bodies may be contaminants, product residues, remnants of labels and/or the like. Defects may, for example, be damage to the containers, such as chipped glass. Likewise, it is conceivable that they are defectively produced material spots, such as local material thickenings or material tapers.

The containers may be transported to the inspection unit by a conveyor as a container stream. The conveyor may comprise a carousel and/or a linear conveyor. It is conceivable, for example, that the conveyor comprises a conveyor belt, which the containers are transported on while standing up into an area between the illumination unit and the camera. Conceivably, containers may hold one or more containers during transport (PUK). The container may also be transported held by lateral straps when, for example, the illumination unit illuminates the bottom of the container and the camera inspects the bottom through the mouth of the container.

The illumination unit may generate the light using at least one light source, such as an incandescent bulb, a fluorescent tube, or at least one LED. In some embodiments, the light may be generated with a matrix of LEDs and emitted in the direction of the light-emitting surface. The light-emitting surface can be designed larger than the camera view of the container. It is also conceivable that the light-emitting surface illuminates only a part of the camera view of the container. An emission point or emission location may be meant to represent a local point or a planar section of the light-emitting surface.

A wavelength range may be meant to represent here, for example, a certain color spectrum portion of the light. It is conceivable that the light-emitting surface emits the light from the emission points in the different emission directions, each with a different wavelength or color. However, it is also conceivable that the wavelength ranges partially overlap. It is conceivable that the different wavelength ranges are emitted by correspondingly different light sources, in particular LEDs. The light may be emitted in the visible spectral range and/or in the non-visible spectral range of the wavelength spectrum. For example, the light in the visible spectral range may be perceptible to the human eye and/or may be in a wavelength range of 380 nm-750 nm. The non-visible spectral range may not be perceptible to the human eye and/or may be in the UV or IR wavelength range. It is also conceivable that the visible spectral range is combined with the non-visible spectral range. For example, the light-emitting surface may emit the light for amber glass containers in the different emission directions with red and infrared wavelength ranges.

The fact that "the light is emitted . . . from emission locations of the planar light-emitting surface in respective different emission directions with different wavelength ranges from one another" may mean here that the light is emitted from a particular emission location of the planar light-emitting surface in one emission direction with a different wavelength range, in particular with a different color, than in another emission direction.

The camera may detect the at least one of the containers and the light transmitted or reflected thereby with a lens and with an image sensor. The image sensor may be, for example, a CMOS or a CCD sensor. Conceivably, the camera transmits the at least one camera image with a data interface to the image processing unit. Conceivably, the light is generated by the illumination unit, then transmits through the containers to be finally captured by the camera. The camera may separate the wavelength range of the detected transmitted or reflected light for each pixel of the at least one camera image. For example, the camera may be a color camera that captures the different wavelength ranges, in particular colors in at least two, in particular three, color channels. For example, the color camera may comprise a Bayer filter to separate the colors.

The image processing unit may process the at least one camera image with a signal processor and/or with a CPU and/or GPU. It is also conceivable that the image processing unit comprises a memory unit, one or more data interfaces, for example a network interface, a display unit and/or an input unit for this purpose. It is conceivable that the image processing unit evaluates the at least one camera image using image processing algorithms that are available as a computer program product in the memory unit.

It is conceivable that the wavelength ranges and/or a radiation characteristic of the emitted light are adapted to a certain task, in particular to a container type. For example, for this purpose, limits of a portion of the planar light-emitting surface including the emission locations may be adapted to a container height and/or width. In other words, the portion of the light-emitting surface that emits the wavelength ranges that differ from one another in the different emission directions may be enlarged or reduced. For example, multi-color LEDs may be driven differently for this purpose, depending on the task at hand.

The light emitted from the light-emitting surface may be encoded with a polarization characteristic in addition to the mutually different wavelength ranges. This allows the emitted light to be locally encoded with the polarization in addition to the directional encoding with the different wavelength ranges. The camera may then separate both the different wavelength ranges and the polarization characteristic in the at least one camera image. A polarization characteristic may be meant to represent the fact here that the light is emitted from the different emission locations of the light-emitting surface with respectively different polarization directions. For example, a polarization filter with a continuously changing polarization characteristic or several polarization filters with different orientations may be arranged within the light-emitting surface, so that the polarization of the emitted light changes locally. It is conceivable that the camera separates the polarization characteristic in the at least one camera image. For this purpose, the camera may comprise, for example, a plurality of image sensors each having a differently oriented polarization filter, or a single image sensor having a polarization filter array. For example, the camera may comprise a Sony IMX250MZR or IMX250MYR type sensor for this purpose.

It is conceivable that the image processing unit evaluates the at least one camera image for the different wavelength ranges in order to additionally detect local material stampings, such as embossings, glass embossings, beads and the like on the containers and/or to distinguish them from the foreign bodies. Such material embossings may be used, for example, as decorative elements. The image processing unit may evaluate the at least one camera image for intensity information and the different wavelength ranges in order to recognize areas having a changed wavelength range and changed intensity information as container rim. Since both a darkening and a particularly large deflection of the light rays occur at the container rim, the container edge may thus be detected particularly easily. For example, the image processing unit evaluates the at least one camera image for a third local area including intensity information that differs from that of an environment and a different wavelength range in order to conclude that the container rim is present.

It is conceivable that the same wavelength range is emitted in at least one of the different emission directions across all emission locations. This makes it particularly easy to evaluate the at least one camera image, since the undamaged areas of the container are predominantly traversed in one emission direction towards the camera and thus appear in the least one camera image with only one of the wavelength ranges. Conversely, the light is deflected by the imperfections and appears with a different wavelength range in the at least one camera image. Consequently, the defects may be distinguished from the undamaged areas with particular ease. However, it is also conceivable that the emission locations each have a different directional distribution with respect to the different wavelength ranges.

A light beam of one of the different emission directions may be refracted towards the camera at one of the defect locations, with another light beam of a different one of the different emission directions extending towards the camera in a vicinity of the defect location.

The image processing unit may evaluate the at least one camera image for a first local area with intensity information differing from a surrounding area to conclude the presence of a foreign body. Due to the fact that defects usually absorb light, they may be detected particularly easily via the deviating intensity information in the at least one camera image.

The image processing unit may evaluate the at least one camera image for a second local area with a wavelength range deviating from an environment in order to conclude on the presence of a defect. Since the defect of the container deflects the light differently than surrounding areas of the defect, it may be detected in this way particularly easily in the at least one camera image. For example, the defect may have a different color in the at least one camera image compared to its surroundings and/or undamaged areas of the container. This fact then suggests that the refraction of light differs from that of the surroundings, and thus the defect.

The at least one camera image may be separated by the image processing unit into an intensity channel and a color channel, wherein the image processing unit detects the foreign bodies on the basis of the intensity channel and the defects on the basis of the color channel. This makes it particularly easy to evaluate the foreign bodies and the defects in the two channels separately. For example, the wavelength range may be a color. For example, using known methods, the at least one camera image may be transformed into the HSV color space, where the H channel corresponds to the color channel and the V channel corresponds to the intensity channel. An intensity channel may mean here a channel for a relative brightness, an absolute brightness or intensity.

In addition, the disclosure provides a device for optically inspecting containers.

Due to the fact that the illumination unit is designed to emit the light from the emission locations of the respective planar light-emitting surface in the different emission directions with wavelength ranges differing from one another, it may be determined, independently of the intensity characteristic of the light-emitting surface, for the respective pixels of the camera image, whether the corresponding light component has been deflected by a defect or whether it has passed through the undamaged areas of the respective container without deflection or only with slight deflection. Because the image processing unit is designed to evaluate the at least one camera image for the various wavelength ranges, it is possible, for example, to distinguish a defect from a foreign body on the basis of a local change in the detected wavelength range. Conversely, the intensity information may still be evaluated in order to detect the absorption of light by foreign bodies particularly well when the radiation characteristic of the light-emitting surface is as diffuse as possible. Consequently, with the device according to the disclosure, it is possible to detect both foreign bodies and defects equally well with a single inspection unit. The fact that this is done with a single inspection unit means that less installation space is required for this.

The device for optically inspecting containers may be designed for carrying out the method. The device may comprise the features described above.

The device for optical inspection may be arranged in a beverage processing plant. The beverage processing plant may comprise container handling machines, in particular a container making machine, a rinser, a filler, a capper, a labeling machine, a direct printing machine, and/or a packaging machine. Conceivably, the device for inspection is associated with one of said container handling machines. The device may thereby be used for full bottle or empty bottle inspection. It is conceivable, for example, that the device is used for inspecting returned returnable containers.

The illumination unit may be designed to emit the light from the emission locations with respective different colors in a visible spectral range. This means that the illumination unit may be provided with particularly frequently used colored light sources, especially LEDs, and is thus particularly cost-effective. In addition, commercially available containers are often at least partially transparent in the visible spectral range and may thus be illuminated particularly well. For example, the light in the visible spectral range may be perceptible to the human eye and/or lie in a wavelength range of 380 nm-750 nm.

The camera may be designed as a color camera. This allows the respective wavelength range to be recorded with low spatial resolution. In some embodiments, the color camera may include a Bayer filter for separating the colors.

The illumination unit may include several light sources for each of the emission locations with the wavelength ranges that are different from one another. This allows the emitted intensity of the respective wavelength range to be adjusted independently. Consequently, the illumination unit may thus be adjusted to a transmission characteristic of the containers, for example to their colors, in a particularly simple manner.

The illumination unit may include at least one lens, in particular a rod lens, Fresnel lens or lenticular lens, in order to focus the light from the respective multiple light sources in the different emission directions for the emission locations. In this way, the illumination unit may be configured in a particularly simple manner so that it emits the light in the different emission directions with wavelength ranges that differ from one another. It is conceivable that the illumination unit included several lenses, in particular rod lenses, which are arranged side by side along one direction in a uniform, linear grid. A rod lens may mean here a lens including a linearly extruded lens profile. However, it is also conceivable that the lenses are arranged as a rectangular or hexagonal lens matrix.

The illumination unit may include at least one white light source and a downstream bandpass interference filter to emit the light for each of the emission locations by interference in the different emission directions with respective wavelength ranges different from each other. As a result, the illumination unit may be constructed particularly easily with only a few elements. A bandpass interference filter may be meant here as a filter system with thin layers in the light wavelength range, which is designed to transmit a certain wavelength range in one emission direction. Because of being traversed by white light in different directions with a different optical path, the layers have a transmitting effect for correspondingly different light wavelengths.

The illumination unit may include a plurality of light sources with mutually different wavelength ranges, in particular LEDs, wherein a respective light source is associated with a respective collimating optics in order to bundle or collimate the light emitted onto a planar scattering element with a scattering angle of less than 20°, in particular less than 15°. In this way, the illumination unit may be constructed with particularly few light sources, while still allowing the emitted intensity of the respective wavelength range to be adjusted independently. The two-dimensional scattering element may have a scattering angle of less than 10°, in particular of less than 5°. The planar scattering element may be arranged along or form the planar light-emitting surface. For example, the planar diffusing element may comprise a diffusing foil and/or a diffusing disc.

BRIEF DESCRIPTION OF THE FIGURES

Further features of the disclosure are explained in more detail below with reference to the embodiments shown in the Figures. In the Figures:

FIGS. 7A-7B are side views of the light-emitting surface and the camera of FIGS. 2 and 3 during inspection of a foreign object and a defect;

DETAILED DESCRIPTION

Figure 1:
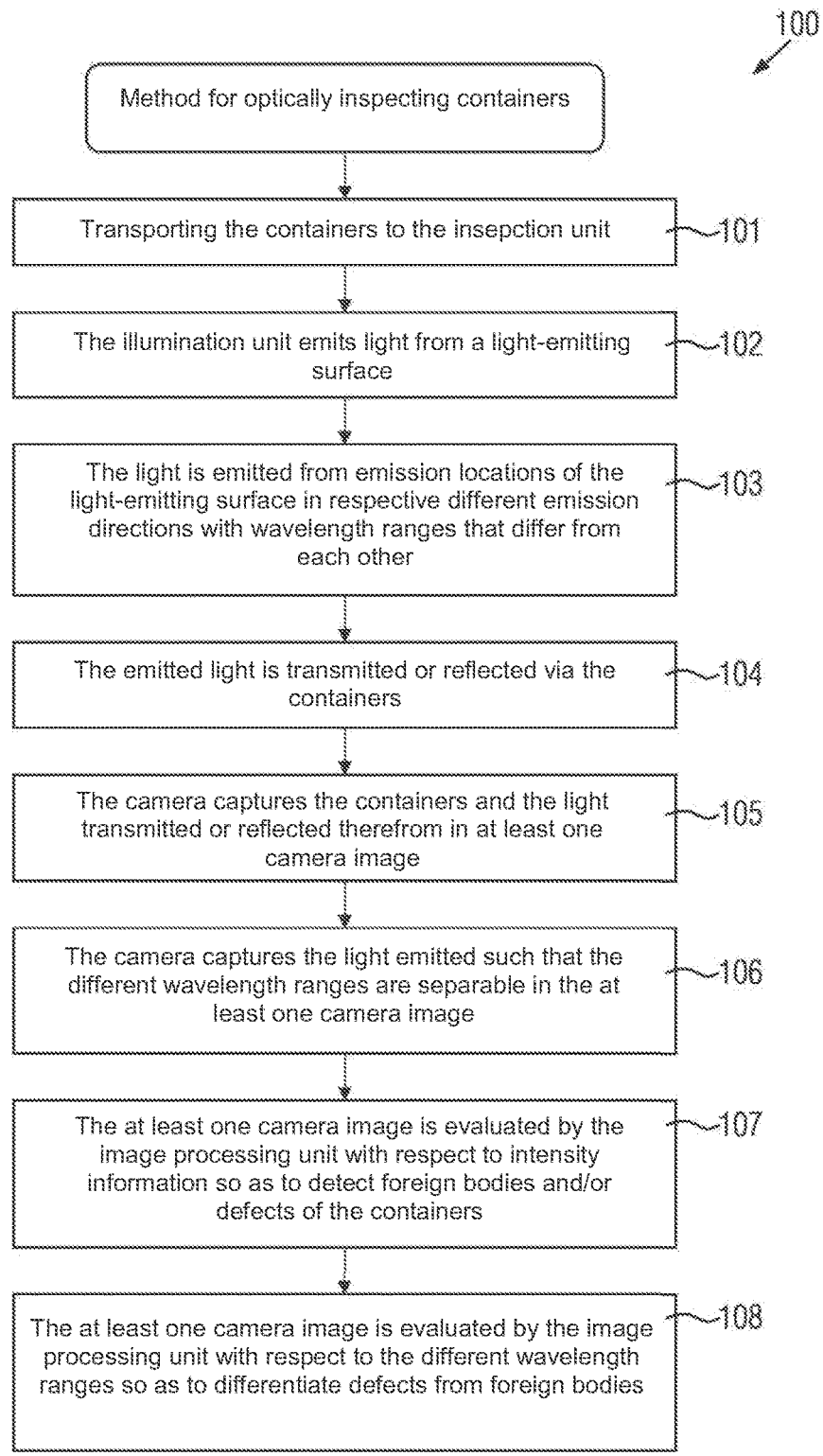
FIG. 1 is an embodiment according to the disclosure of a method for optically inspecting containers as a flow diagram.
Figure 2:
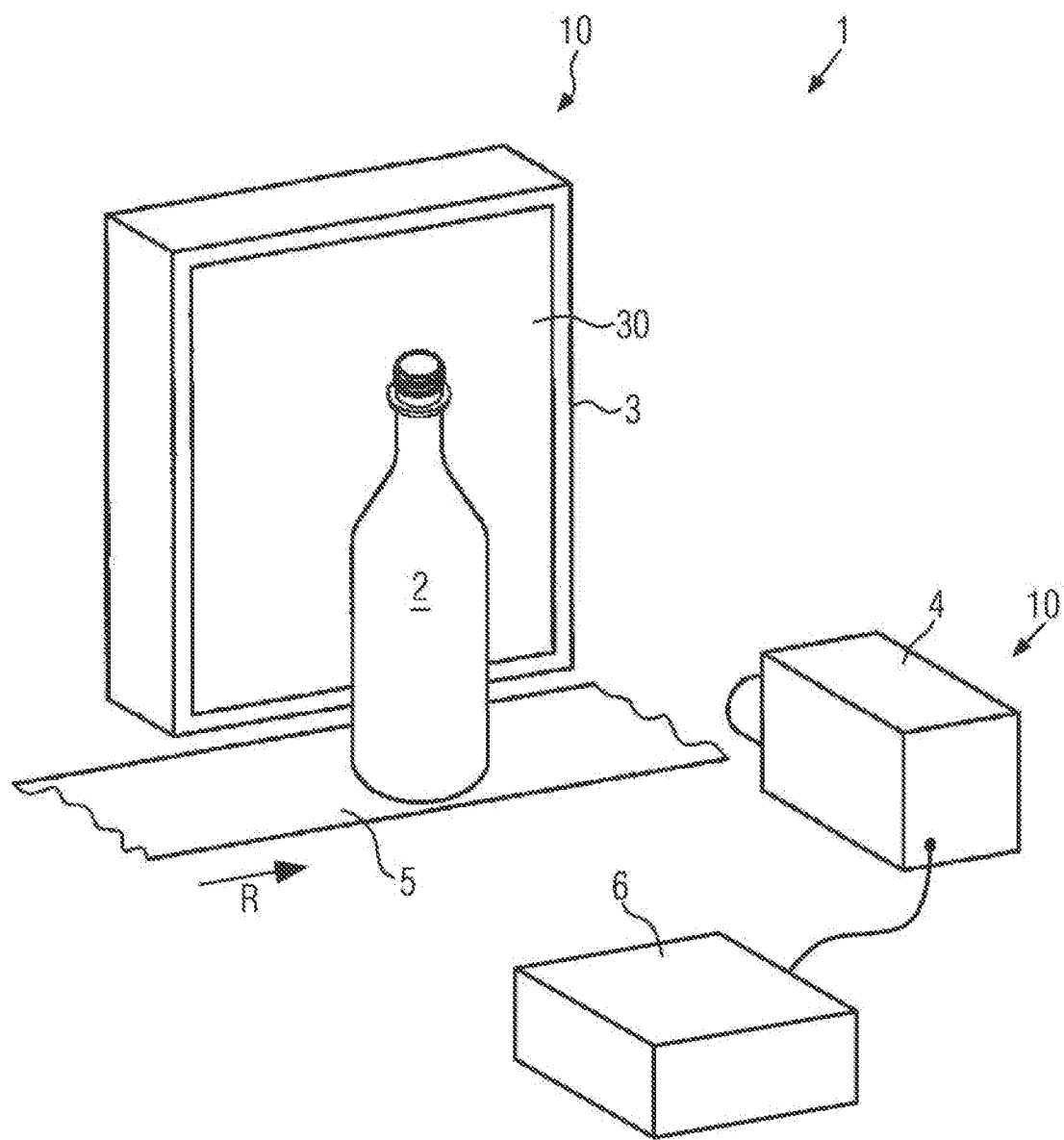
FIG. 2 shows a perspective view of a device for optically inspecting containers according to the disclosure.

In FIG. 1, an embodiment of a method 100 for inspecting containers 2 according to the disclosure is shown as a flowchart. The method 100 is explained in more detail with reference to FIGS. 2-6B:

In FIG. 2, an embodiment according to the disclosure of a device 1 for optically inspecting containers 2 is shown as a perspective view. There is shown the inspection unit 10 with the illumination unit 3 and with the camera 4. Therebetween the conveyor 5 is arranged, which is designed here only exemplarily as a conveyor belt, on which the containers 2 are transported in the direction R between the illumination unit 3 and the camera 4 (step 101). As an example only a single container 2 is shown which is being inspected. Nevertheless, the containers 2 are transported on the conveyor 5 as a stream of containers and are each inspected optically between the illumination unit 3 and the camera 4.

The illumination unit emits light from the planar light-emitting surface 30 to transmit the light through the containers 2 (step 102). The emitted light is transmitted via the containers 2 toward the camera 4 (step 104). It is also conceivable that, due to the arrangement of the illumination unit 3 opposite to the camera 4, the light is reflected via the containers 2. The camera 4 is arranged on the inspection unit 10 such that it detects the containers 2 and light transmitted thereby in at least one camera image (step 105).

The illumination unit 3 is configured to emit the light from the emission locations 31-42 of the light-emitting surface 30 shown in the following FIGS. 3A-3B, respectively, in different emission directions A1, A2, A3 with wavelength ranges differing from each other (step 103). The structure of the illumination unit 3 is explained in more detail below with reference to the embodiments in FIGS. 4-6. Accordingly, the camera 4 is configured to detect the light in such a way that the different wavelength ranges may be distinguished from one another in the at least one camera image (step 106).

Furthermore, the image processing unit 6 is illustrated, with which the at least one camera image is evaluated for intensity information in order to detect foreign bodies and/or defects in the containers (step 107). This may be accomplished, for example, by image processing algorithms known per se for detecting local changes in the at least one camera image.

In addition, the image processing unit 6 evaluates the at least one camera image for the different wavelength ranges to distinguish the defects from the foreign bodies (step 108).

Figures 3A, 3B:
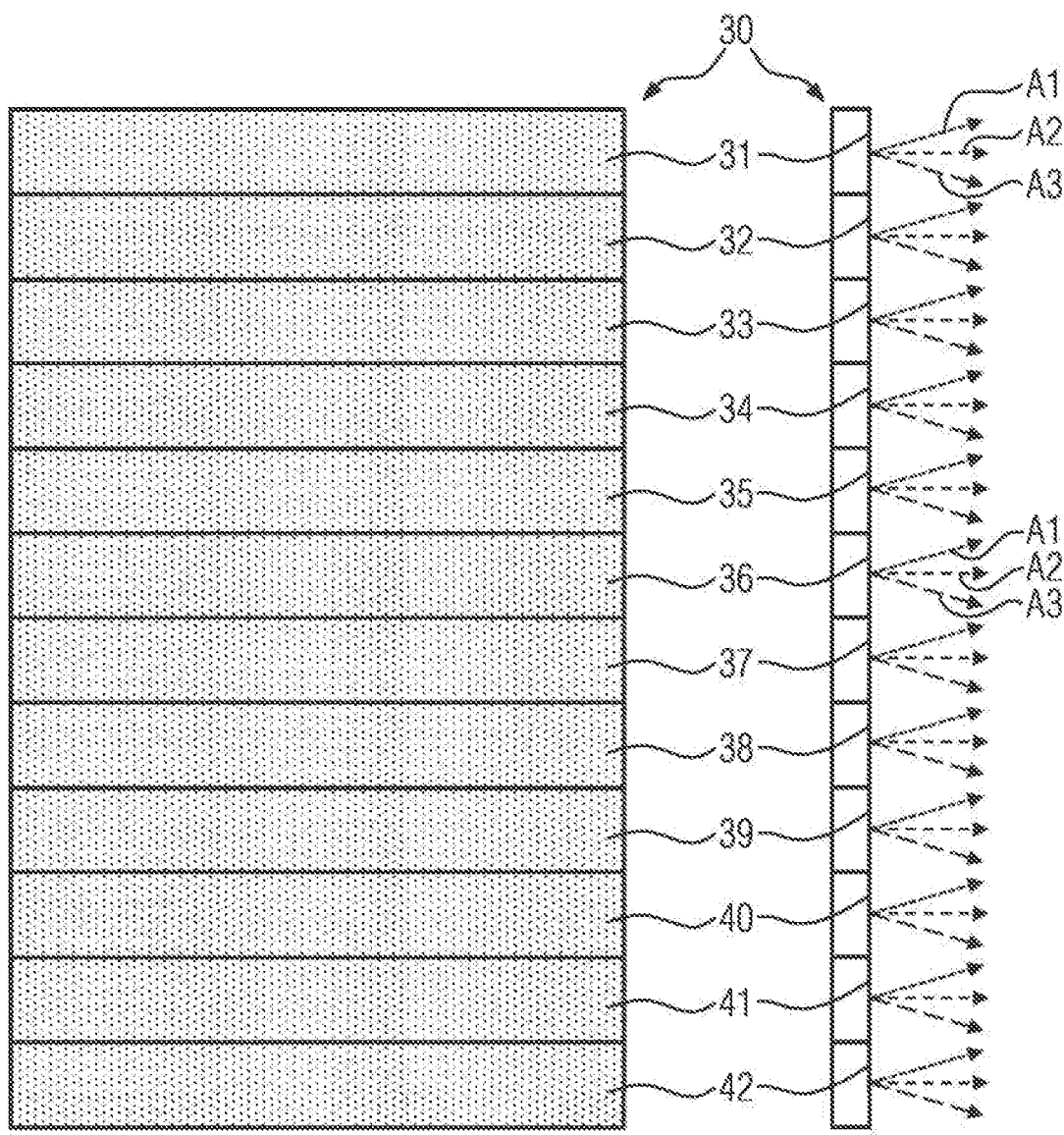
FIG. 3A is a detailed view of the light-emitting surface of the illumination unit from FIG. 2.
FIG. 3B is a side detail view of the light-emitting surface of FIG. 3A with the different emission directions.

The method 100 and the device 1 are explained in more detail below with reference to FIGS. 3-8C:

In FIG. 3A, a detailed view of the light-emitting surface 30 of FIG. 2 is shown. In addition, FIG. 3B shows a detailed side view of the light-emitting surface 30 from FIG. 3A with the different emission directions. In detail, the different emission locations 31-42 of the light-emitting surface 30 can be seen, from which light with wavelength ranges different from each other is emitted in each of the different emission directions A1-A3.

For example, light in a green wavelength range is emitted from the emission locations 31-42 in the emission direction A1, light in a yellow wavelength range is emitted in the emission direction A2, and light in a red wavelength range is emitted in the emission direction A3. Thus, if the light-emitting surface 30 is viewed from a direction opposite to the emitting direction A1, it appears green, whereas it appears yellow when viewed from opposite to the emitting direction A2 or red when viewed from opposite to the emitting direction A3. Consequently, in a respective one of the different emission directions A1-A3 the same wavelength range is emitted across all emission locations.

However, it is also conceivable that the emission locations 31-42 each have a different directional distribution with respect to the different wavelength ranges.

The wavelength ranges may be distributed continuously or in discrete steps across the emission locations A1-A3.

Indeed, in FIGS. 3A-3B individual ranges for the emission locations 31-42 are shown purely graphically. However, it is also conceivable that the emission locations are distributed squarely or hexagonally across the light-emitting surface. In particular, the emission locations may form a continuum without being discretely separated from each other.

In order to capture the different wavelength ranges and store them in the least one camera image, the camera 4 in this embodiment is designed as a color camera.

Figure 4:
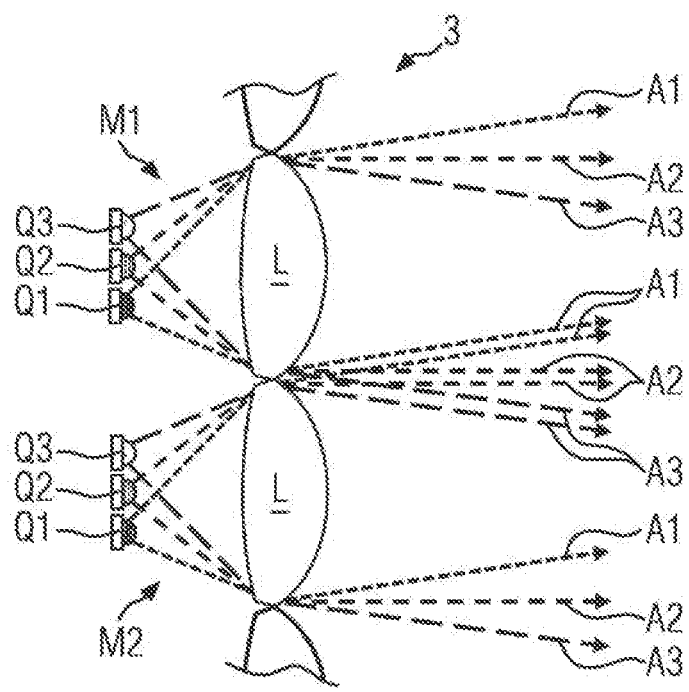
FIG. 4 is a detailed side view of an embodiment of the illumination unit with lenses for emitting the different wavelength ranges in the different emission directions.

FIG. 4 shows a detailed side view of an embodiment of the illumination unit 3 with lenses L for emitting the different wavelength ranges in the different emission directions A1-A3. Only a section with two light modules M1, M2 arranged next to each other is illustrated. Further light modules of the illumination unit are configured accordingly and are not shown here in more detail. The illustration in FIG. 4 is merely exemplary. It is conceivable that the illumination unit includes only a single such light module M1.

Each of the light modules M1, M2 includes the light sources Q1-Q3 arranged next to each other and a lens L, which is designed here, for example, as a rod lens. The light sources Q1-Q3 are of different types and emit light with wavelength ranges being different from each other. For example, light source Q1 emits light in a green wavelength range, light source Q2 emits light in a yellow wavelength range, and light source Q3 emits light in a red wavelength range.

By means of the lenses L, the light from the light source Q1 is focused in the emission direction A1, the light source Q2 is collimated in the emission direction A2, and the light source Q3 is focused in the emission direction A3. As a result, light with wavelength ranges different from each other may be emitted from the emission locations 31-42 in the different emission directions A1-A3, respectively.

The lenses L are designed here, for example, as rod lenses, whereby the profile contour shown extends linearly perpendicular to the drawing plane. As a result, the lens has a focusing refractive power only in the drawing plane. For example, several light sources Q1-Q3 may thus be arranged next to each other in the longitudinal direction of the lens L in a row, i.e. perpendicular to the drawing plane.

However, a rectangular or a hexagonal arrangement of the lenses L is also conceivable.

Figure 5:
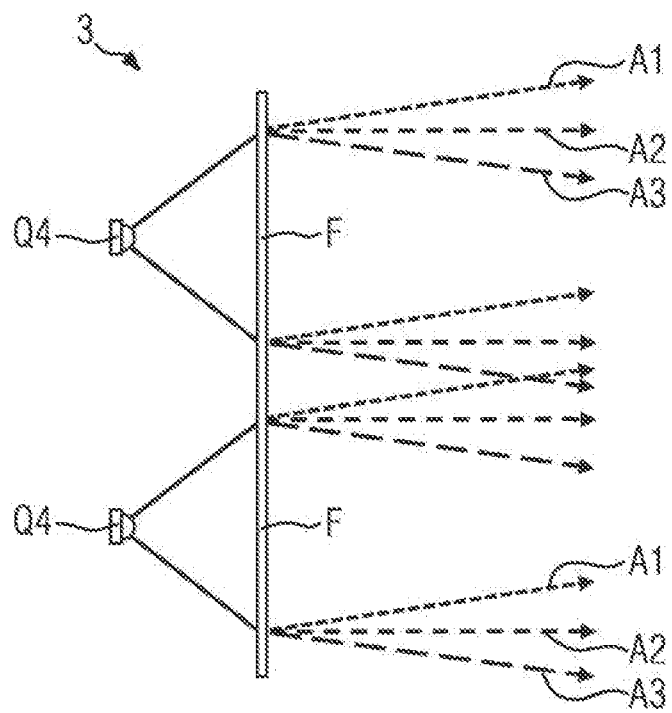
FIG. 5 is a detailed side view of a further embodiment of the illumination unit with a bandpass interference filter for emitting the different wavelength ranges in the different emission directions.

FIG. 5 shows a detailed side view of another embodiment of the illumination unit 3 with a bandpass interference filter F for emitting the different wavelength ranges in the different emission directions A1-A3.

It is shown that the illumination unit 3 includes several white light sources Q4, of which only two are shown here as an example. However, it is also conceivable that the illumination unit 3 includes only a single white light source Q4. They emit broadband light in a spectral range of 380 nm-750 nm. Then, the white light passes through the downstream bandpass interference filter F to emit the light for the emission locations 31-42, respectively, by interference in the different emission directions A1-A3 with the wavelength ranges being different from each other. For this purpose, the bandpass interference filter F has a plurality of thin layers whose thicknesses are in the spectral range of white light. Since the filter characteristic of such bandpass interference filters F is direction-dependent, the white light is transmitted in different colors depending on the emission directions A1-A3.

Figure 6:
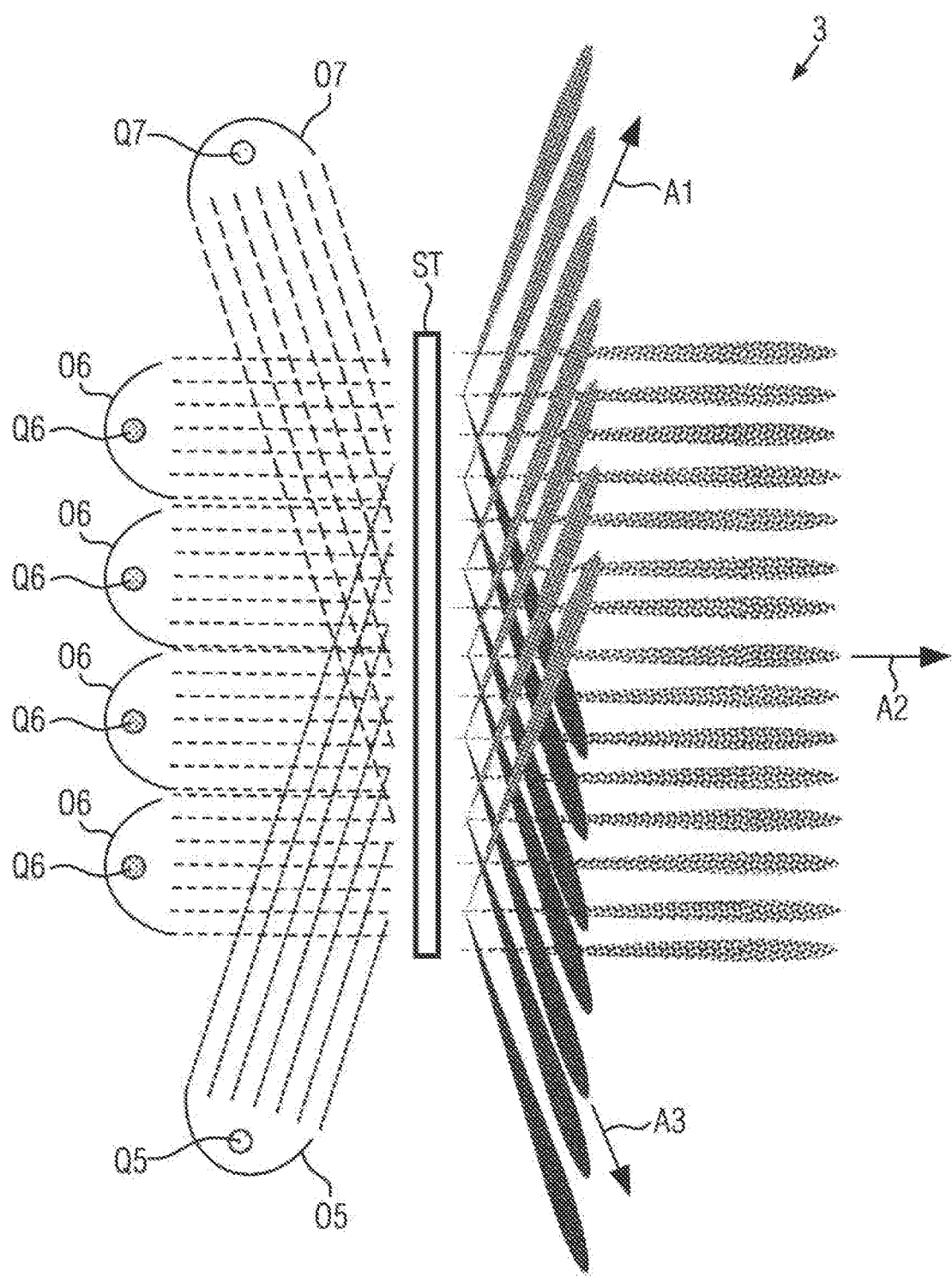
FIG. 6 is a detailed side view of a further embodiment of the illumination unit with a diffusing disk for emitting the mutually different wavelength ranges in the different emission directions.

FIG. 6 shows a detailed side view of another embodiment of the illumination unit 3 with a diffusing disk ST for emitting the different wavelength ranges in the different emission directions A1-A3.

It is shown that the illumination unit 3 includes a plurality of light sources Q5-Q7 with the mutually different wavelength ranges. For example, these may be LEDs with different colors. A collimating optics O5-O7, for example parabolic mirrors, is associated with each of the light sources in order to collimate the light emitted by the light sources Q5-Q7 onto the scattering element ST. The optical axis of the collimating optics O5 is in the direction of the emission direction A1, that of the collimating optics O6 in the direction of the emission direction A2 and that of the collimating optics O7 in the direction of the emission direction A3. In order to avoid gaps without light between the emission directions A1-A3, the scattering element ST is provided, which fans out again the light bundled or collimated by the collimating optics O5-O7. A scattering angle of less than 20°, in particular less than 15°, is particularly advantageous. The scattering element ST may include, for example, a scattering foil.

In FIGS. 7A-7B, a side view of the light-emitting surface 30 and the camera 4 from FIGS. 2 and 3 is shown during inspection of a foreign object 8 and a defect 7. In FIG. 7B, the detail D of FIG. 7A is shown.

The planar light-emitting surface 30 is illustrated with the various emission locations 31-42 in a lateral profile. From this, the light is emitted in a planar manner in the direction of the camera 4 and thus passes through the container 2. The container 2 consists here, for example, of a transparent glass material, so that the light is transmitted through the container 2.

The camera 4 includes the image sensor 41 and the lens 42 to capture the container 2 in at least one camera image. It is conceivable that the camera 4 is configured as a color camera with a Bayer filter.

There is also shown the light beam S1, which, starting from the emission location 39, illuminates the container 2 in the emission direction A2. It hits the foreign body 8, which absorbs part of its energy. Consequently, the foreign body 8 appears in the at least one camera image of the camera 4 with reduced intensity compared to its immediate surroundings. Because the foreign body does not deflect the light beam S1, it appears in the at least one camera image with the same wavelength range as its immediate surroundings.

Furthermore, there is shown the light beam S2 which, starting from the radiation location 37 in the emission direction A2, illuminates the container 2 in the vicinity of the defect 7. Here, depending on the material of the container 2, the light is absorbed only to a small extent, so that the corresponding pixel in the at least one camera image appears with a high intensity and with the wavelength range of the emission direction A2. Furthermore, as can be seen in FIG.

7B, the light beam S2 passes through the container 2 at a point where the container inner wall 22 and the container outer wall 21 are plane-parallel to each other. Consequently, the light beam S2 experiences only a slight offset, but no change in direction, depending on the angle of incidence. Consequently, the corresponding pixel appears in the at least one camera image with high intensity and with the wavelength range of the emission direction A2. Consequently, they appear as intact area of the container 2 in the at least one camera image with the wavelength range of the emission direction A2.

In contrast, it can be seen in FIG. 7B that the defect 7 has local notch areas 71, 72 on the container outer wall 21. This may be, for example, a notch due to a spalling. Consequently, the light beams S3, S4 are deflected at the local notch surfaces 71, 72 by light refraction. More precisely, the light beam S3 is emitted from the emission location 38 in the emission direction A1 and is deflected towards the camera 4 by light refraction when passing through the container 2 at the first notch surface 71. In contrast, the light beam S4, starting from the emission location 34, passes through the container 2 with the emission direction A3 and is deflected by light refraction at the second notch surface 72 toward the camera 4. Accordingly, the defect 7 appears in the at least one camera image with a wavelength range that differs from the surrounding area, in particular it differs in color, due to the local light refraction at the notch surfaces 71, 72.

Figure 8A:
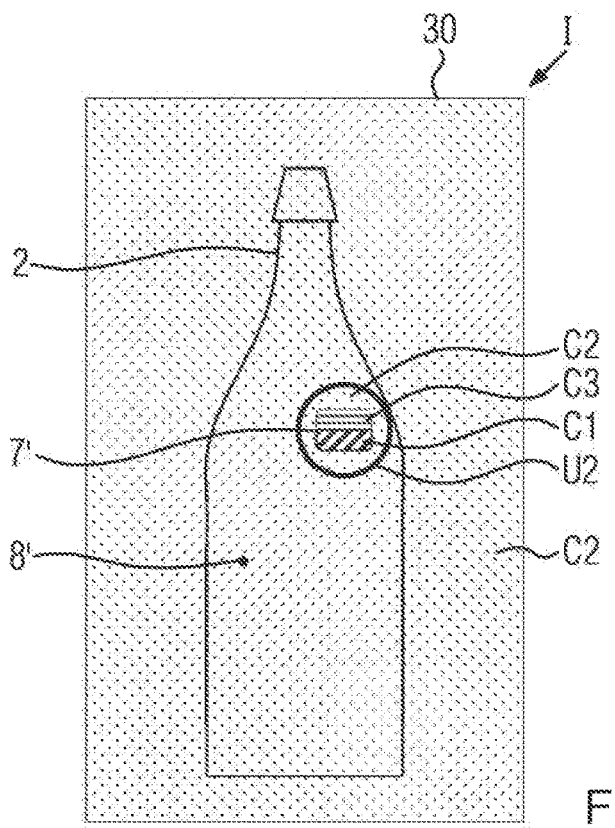
FIG. 8A shows the camera image during inspection of the foreign object and defect of FIGS. 7A-7B.

FIG. 8A shows in more detail a camera image I during inspection of the foreign body 8 and the defect 7.

It can be seen that the container 2 appears in front of the light-emitting surface 30 in the camera image I. Furthermore, it can be seen that the foreign body 8 is imaged as a darkened first local area 8'. In contrast, the defect 7 is imaged as a second local area 7' with an intensity similar to that of the immediate surroundings, but it appears there in the upper area with the color value C3 of the emission direction A3 and in the lower area with the color value C1 of the emission direction C1, since the beams are locally deflected by the defect 7, as shown in FIG. 7A.

As a result of the fact that the light is emitted from emission locations 31-42 of the planar light-emitting surface 30 in each case in different emission directions A1, A2, A3 with wavelength ranges differing from one another and is detected by the camera 4 in this way, the undamaged areas of the container 2 and the surroundings U2 appear in the at least one camera image I predominantly with the color value C2 of the emission direction A2. Likewise, the foreign body 8 only darkens the image information, but does not change the color value C2.

In contrast, the defect 7 appears with the color values C1 and C3 and may thus be distinguished from the foreign body 8 particularly easily by the image processing unit 6.

Figure 8B:
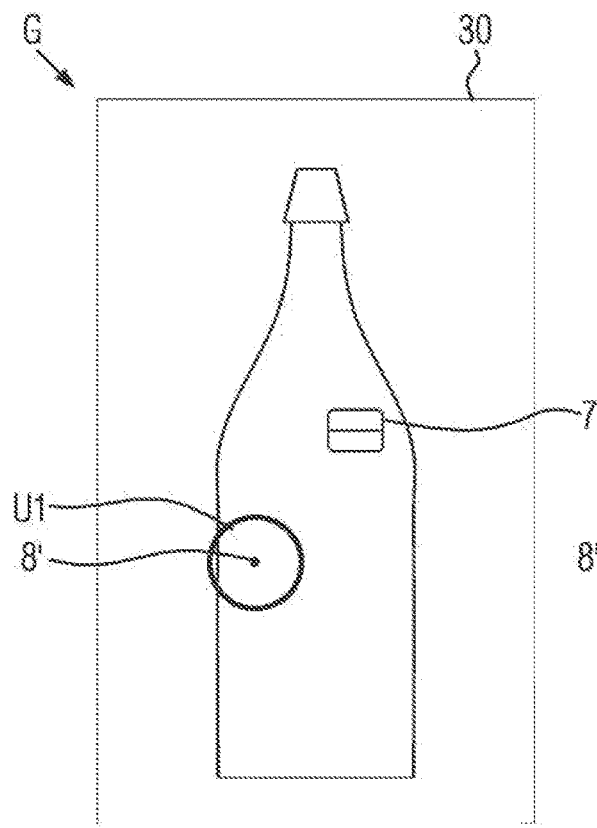
FIGS. 8B-8C show the intensity channel G and the color channel C of the camera image I of FIG. 8A.
Figure 8C:
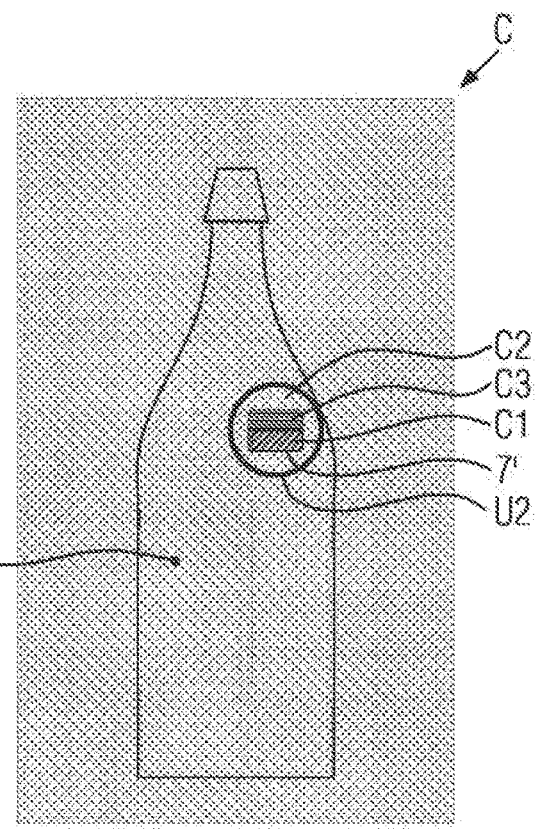

FIGS. 8B-8C show the intensity channel G and the color channel C of the camera image I from FIG. 8A. The image processing unit 6 shown in FIG. 2 first separates the camera image I shown in FIG. 8A into the intensity channel G and the color channel C. The intensity channel G and the color channel C are separated by the image processing unit 6. For example, the camera image I is divided pixel by pixel into brightness values in the intensity channel G and color values in the color channel C on the basis of an HSV color model.

The image processing unit 6 then evaluates the intensity channel G of the camera image I for the first local area 8' with intensity information deviating from the environment U1 in order to conclude the presence of the foreign body 8. For example, this is done by means of a filter for detecting brightness variations.

Furthermore, the image processing unit 6 evaluates the color channel C of the camera image I for the second local area 7' with wavelength range deviating with respect to the environment U2. As can be seen in FIG. 8C, the local area 7' of the defect 7 appears in the upper area with the color value C3 and in the lower area with the color value C1. In contrast, the immediate surrounding area U2 has the color value C2. Since the second local area 7' has different color values C1, C3 compared to its surroundings U2, the defect 7 is distinguishable from the foreign body 8.

After detection of the foreign body 8 and/or the defect 7, a signal is generated by the image processing unit 6 that the container 2 has the foreign body 8 or the defect 7. Based on the signal, a switch may be controlled, for example, to eject the affected container 2 for renewed cleaning or recycling after the inspection.

Since the light is emitted from the emission locations 31-42 of the planar light-emitting surface 30 in the different emission directions A1-A3 with different wavelength ranges, it may be determined independently of the intensity characteristic of the light-emitting surface 30 for the pixels of the camera image I whether the corresponding light portion has been deflected by a defect 7 or whether it has passed through the undamaged areas of the respective container 2 with little or no deflection. Due to the fact that the image processing unit 6 evaluates the at least one camera image I with respect to the various wavelength ranges, it is possible, for example, to distinguish a defect 7 from a foreign body 8 on the basis of a local change in the detected wavelength range. Conversely, the intensity information may still be evaluated in order to detect the absorption of light by foreign bodies 8 particularly well when the radiation characteristic of the light-emitting surface 30 is as diffuse as possible. Consequently, the method according to the disclosure enables the detection of both foreign bodies 8 and defects 7 equally well with a single inspection unit 10. The fact that this is accomplished with a single inspection unit 10 means that a smaller installation space is required for this purpose.

It is understood that features mentioned in the previously described embodiments are not limited to this combination of features, but are also possible individually or in any other combination.

The invention claimed is:

1. A method for optically inspecting containers, wherein the containers are transported to an inspection unit including an illumination unit and a camera, wherein the illumination unit emits light from a planar light-emitting surface having a diffuse radiation characteristic, wherein the light is transmitted or reflected via the containers, wherein the camera captures at least one of the containers and captures the light transmitted or reflected thereby in at least one camera image, and the at least one camera image being evaluated with an image processing unit for intensity information in order to detect foreign bodies and/or defects in the containers, wherein at least one of local points of the light-emitting surface or planar sections of the light-emitting surface constitute a plurality of emission locations each emitting the light in different emission directions with mutually different wavelength ranges such that the light is emitted from the particular emission location in at least one emission direction with a different wavelength range than in at least one other emission direction, wherein the emission locations each emit the light with different colors, and wherein the light is detected by the camera such that the different wavelength ranges are distinguishable from one another in the at least one camera image, and such that the image processing unit evaluates the at least one camera image with respect to the different wavelength ranges in order to distinguish the defects from the foreign bodies.

2. The method according to claim 1, wherein in at least one of the different emission directions a same wavelength range is emitted across all emission locations.

3. The method according to claim 1, wherein a light beam of one of the different emission directions is refracted towards the camera at one of the defects, and wherein in a vicinity of the one of the defects another light beam of another of the different emission directions extends towards the camera.

4. The method according to claim 1, wherein the image processing unit evaluates the at least one camera image with respect to a first local area with intensity information deviating from a surrounding area in order to conclude on a presence of a foreign body.

5. The method according to claim 4, wherein the image processing unit evaluates the at least one camera image with respect to a second local area with a wavelength range deviating from an environment in order to conclude on the presence of a defect.

6. The method according to claim 1, wherein the at least one camera image is separated by the image processing unit into an intensity channel and a color channel, and wherein the image processing unit detects the foreign bodies on the basis of the intensity channel and the defects on the basis of the color channel.

7. A device for optically inspecting containers comprising:
an inspection unit including an illumination unit and a camera,
an image processing unit for processing at least one camera image of the camera, and
a conveyor for transporting the containers to the inspection unit,
wherein the illumination unit is configured to emit light with a planar light-emitting surface so as to illuminate and/or transilluminate the containers,
wherein the camera is arranged on the inspection unit so as to detect at least one of the containers and detect light transmitted or reflected thereby in the at least one camera image,
wherein the image processing unit is configured to evaluate the at least one camera image for intensity information so as to detect foreign bodies and/or defects of the containers, and wherein
at least one of local points of the light-emitting surface or planar sections of the light-emitting surface having a diffuse radiation characteristic constitute a plurality of emission locations each emitting the light in different emission directions with mutually different wavelength ranges such that the light is emitted from the particular emission location in at least one emission direction with a different wavelength range than in at least one other emission direction, wherein the illumination unit is configured to emit the light from the emission locations each with different colors, in that the camera is configured to distinguish the different wavelength ranges from one another in at least one camera image, and
in that the image processing unit is designed to evaluate the at least one camera image with respect to the different wavelength ranges in order to distinguish the defects from the foreign bodies.

8. The device according to claim 7, wherein the different colors are in a visible spectral range.

9. The device according to claim 7, wherein the camera is configured as a color camera.

10. The device according to claim 7, wherein the illumination unit comprises a plurality of light sources with the mutually different wave ranges for the emission locations.

11. The device according to claim 10, wherein the illumination unit comprises at least one lens so as to collimate, for the emission locations, the light from each of the plurality of light sources in the different emission directions.

12. The device according to claim 7, wherein the illumination unit comprises at least one white light source and a downstream bandpass interference filter so as to emit, for each of the emission locations, the light by interference in the different emission directions with the mutually different wavelength ranges.

13. The device according to claim 7, wherein the illumination unit comprises a plurality of light sources with the mutually different wavelength ranges, and wherein each of the light sources is associated with a bundling optical system in order to collimate the light emitted therefrom onto a planar scattering element with a scattering angle of less than 20°, or of less than 15°.

14. The device according to claim 11, wherein the illumination unit comprises a rod lens, a Fresnel lens or a lenticular lens.

15. The device according to claim 13, wherein the plurality of light sources are LEDs.

* * * * *